United States Patent [19]

Prein et al.

[11] Patent Number: 4,890,035

[45] Date of Patent: Dec. 26, 1989

[54] DISCHARGE ELECTRODE WITH MICROSTRUCTURE SURFACE

[75] Inventors: Franz Prein, Neckargemund; Jurgen Wiegand, Eppelheim; Peter Frey; Norbert Klink, both of Pforzheim, all of Fed. Rep. of Germany

[73] Assignees: Eltro GmbH; Doduco KG, both of Fed. Rep. of Germany

[21] Appl. No.: 333,795

[22] Filed: Apr. 4, 1989

Related U.S. Application Data

[63] Continuation of Ser. No. 121,469, Nov. 17, 1987, abandoned.

[30] Foreign Application Priority Data

Nov. 18, 1986 [DE] Fed. Rep. of Germany ....... 3639384
Dec. 15, 1986 [DE] Fed. Rep. of Germany ....... 3642749

[51] Int. Cl.⁴ .............................................. H01J 61/06
[52] U.S. Cl. .................................... 313/633; 313/309; 313/346 R
[58] Field of Search ................... 313/309, 633, 346 R

[56] References Cited

U.S. PATENT DOCUMENTS

| 2,449,113 | 9/1948 | Fruth | 313/633 X |
| 3,742,282 | 6/1973 | Siegle | 313/633 X |
| 4,496,875 | 1/1985 | Barth et al. | 313/633 X |
| 4,524,297 | 6/1985 | Gärtner | 313/346 R |
| 4,672,268 | 6/1987 | Duenisch et al. | 313/633 |

FOREIGN PATENT DOCUMENTS

| 2222845 | 12/1972 | Fed. Rep. of Germany |
| 1908083 | 9/1979 | Fed. Rep. of Germany |
| 3133786 | 3/1983 | Fed. Rep. of Germany |
| 3224644 | 1/1984 | Fed. Rep. of Germany |
| 3148570 | 11/1984 | Fed. Rep. of Germany |
| 3316027 | 11/1984 | Fed. Rep. of Germany |
| 8502305 | 9/1985 | Fed. Rep. of Germany |
| 3443539 | 6/1986 | Fed. Rep. of Germany |
| 3506296 | 8/1986 | Fed. Rep. of Germany |
| 3523926 | 1/1987 | Fed. Rep. of Germany |

OTHER PUBLICATIONS

Japan J. Appl. Phys., vol. 14, 1975, pp. 151, 152, Jun Kudo and Shogo Nakamura, SiC Whisker as a Field Emitter.
J. Appl. Phys. vol. 41, 1970, pp. 76–81, H. E. Cline, Multineedle Field Emission from the Ni–W Eutectic.
Vacuum, vol. 25, 1975, pp. 425, 426, E. Braun et al., Carbon Fibres as Field Emitters.
Naturwissenschaften, vol. 9, 1962, p. 201, Hajek and Eckertova, Die Konstruktion einer stabilen Feldkathode.
J. Appl. Phys., vol. 44, 1973, pp. 2566–2570, Ramon U. Martinelli, Negative electron affinity surfaces on silicon ....
Int'l Elektronische Rundschau, vol. 3, 1965, pp. 123–126, K. M. Tischer, Der heutige Stand der Kaltkatodenentwicklung.
J. Appl. Phy., vol. 52, 1981, pp. 699–705.

Primary Examiner—Palmer C. DeMeo
Attorney, Agent, or Firm—Michael N. Meller

[57] ABSTRACT

A surface for electrical discharge for incorporation in a gas discharge chamber and designed to produce a uniform distribution of the field strength factor, and an increase in the photon and/or the electron density. This is achieved by employing a microstructure combining at least two materials of different physical properties and having a geometry which increases electron emission.

19 Claims, 2 Drawing Sheets

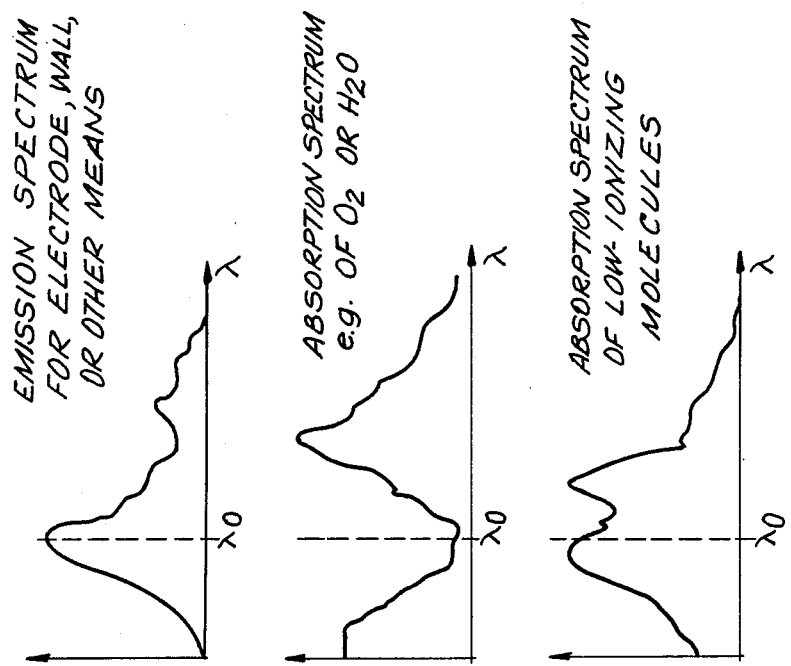
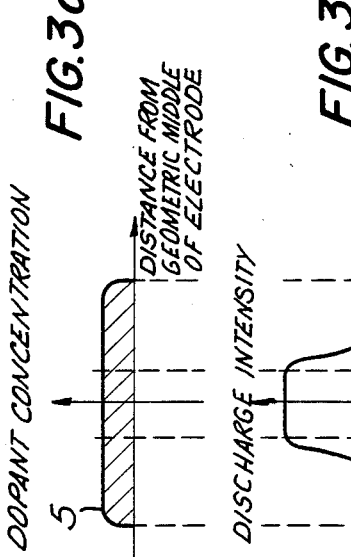
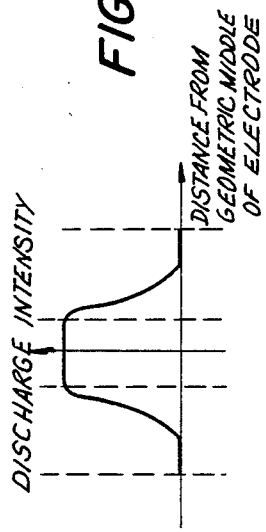
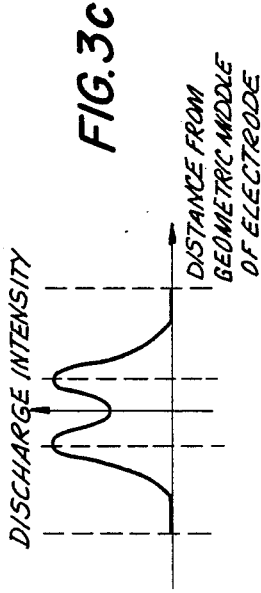

DISCHARGE ELECTRODE WITH MICROSTRUCTURE SURFACE

This application is a continuation of application Ser. No. 121,469 filed Nov. 17, 1987, and now abandoned.

FIELD OF THE INVENTION

The invention relates to a surface for electric discharge, in particular, within a gaseous medium.

BACKGROUND OF THE INVENTION

The article "Surface damage on stainless steel and molybdenum electrodes caused by electrical breakdown in high vacuum" by M. K. Sinha, Yee-Gee Ku and Randall P. Johnson in J. Appl. Phys., Vol. 52, No. 2, February 1981, pp. 699≈705, shows and describes the behavior of pure metal electrodes (for example, steel or molybdenum) upon connection in a high vacuum. As illustrated in FIG. 2 of this publication, bubble nucleation leads to cracking and consequent destruction of the surface.

DE-OS No. 3224644 relates to a cathode for gas lasers made from three metal carbide layers, such as tantalum or niobium, and a method for its manufacture.

According to DE-PS No. 3148570 or EP-A No. 0081081, an improvement of the discharge properties of a catalytic gas laser can be achieved by adding low-ionizing molecules to the gas.

In "Elektrische Kontake und ihre Werkstoffe", Spring Verlag, 1984, pp. 48 et seq., the emission of electrons from metals by field and thermal emission is discussed. This reference explains that in metallic solids the electrons are freely movable, which in accordance with the so-called Fermi statistics can be explained through incompletely occupied energy bands. Further, this reference discloses the galvanic production of contact materials in energy technology (pp. 171 et seq.), the production of solid solutions by sintering (pp. 185 et seq.), and the coating of materials with a carrier layer by plating (pp. 279 et seq.). The method of powder metallurgy is selected when heterogeneous materials made of two or more components cannot be joined to each other by smelting because of their total or also slight solubility in the solid as well as in the liquid state.

These contact materials, in the manner of ionic plating, applied by chemical vacuum deposition (CVD), laser chemical vacuum deposition (LCVD), and physical vacuum deposition (PVD), have to date found no application in discharge physics because the physical processes have only limited similarity. The arc time constant in the former case is about 10 msec and the current density is about $10^6$ A/cm$^2$. This differs by powers of 10 from corresponding values in discharge physics, where the spark time is in the nanosecond range and the current density is about $10^2$ A/cm$^2$.

In gas lasers, such as the excimer or $CO_2$ lasers, as well as in laser amplifiers and switches, such as spark gaps, with triggering and discharge critical gas mixtures, for example, high $CO_2$ or $O_2$ content, as well as all those with high gas pressures, fast catalyzers and large power densities with a high power supply and pulsed operation, the requirements with respect to electrical discharge are especially high. During the time interval for preionization and primary discharge essentially controlled by the pulse timing, shape and peak power, the laser mode, lifetime, and reproducbility are controlled for the discharge operation as such.

BRIEF SUMMARY OF THE INVENTION

The object of the invention is to so improve an electrode or wall surface of a discharge chamber that in addition to an even distribution of the field strength factor, a decrease in the spark time (arc time constant) as well as an increase in the photon and/or the electron, i.e. current, density are achieved for pre- and primary discharge with a low sputter rate and long lifetime. This object is realized in accordance with the invention by providing a surface for gas discharge having a microstructure with particle size in the range 0.1-100 microns, which surface comprises at least two substances having different physical properties and has a geometric form that increases the electric field emission. In this way the electron, photon and ion production can be inhibited in those zones in which discharge occurs, that is, in the cathode and/or anode chamber. By this means the best possible utilization of the central space is realized. In particular, a homogenous mode structure as well as the suppression of side modes produced by a laser, as well as edge and wall effects (for example, partial discharge at boundaries) in particular for a spark gap, can be achieved, the last of which have a negative effect on lifetime and reproducibility. At the same time the sputter rate can be reduced, whereby sputtering in the base area of the microvolume in the gas volume and the consequent detrimental effects on the laser or spark gap function as well as the durability of the equipment can be avoided. A further advantage is that dissociation of the molecules produced in the gas chamber (for example, $CO_2$, $N_2$, $C_NH_M$) is minimized. Furthermore, the current curve of the discharge is steep and for this reason the dependence of the discharge and the pump operation on temperature, pressure, gas composition, and electrical parameters is reduced. Local heating, fusing and crater formation on the surface are limited, so that the microstructure remains relatively stable. This helps to stabilize the surface charge which increases during pauses in operation due to absorption from the gas chamber, which has negative effects on the reproducibility.

Depending on the method of employment of the surface, the materials making up the surface can be selected to have one or more different properties taken from the following: band structure (i.e. Fermi levels), electron emission energy, emission spectrum, absorption spectrum, electrical conductivity, melting point, or type and size of the microstructure.

Also an embodiment having a geometric form with small radii of curvature, which increases the electric field emission, is advantageous. Materials having low electron emission energies can be placed in a matrix, for example, made of tungsten, the portion of material being less than 20 wt. %, the fine structure of which increases the field, which also produces a low emission energy for electrons. These materials can be in a solid, liquid or gaseous state.

In the foregoing context, it is advantageous to use solid solutions formed by powder metallurgy, fiber-reinforced plastics or fiber composites. The preionization as well as the main pulse depend on the reactions occurring on the electrical discharge surface and in the gas volume. An exercise of influence on the materials is possible by means of the discharge process and an optimization of the discharge spectra, which becomes especially important. With the help of optical (spectral) filters, for example, layers on the surface, this optimization can be further improved. The emission spectrum produced by discharge is dependent, among other things, on the materials employed in the surface and also on the molecules added to the surface or present in proximity to the surface. The intensity and wavelength of the emission spectrum are influenced by the choice of materials and molecules. These can be stored in a reservoir in the surface for improvement of discharge properties. By corresponding selection of the pore size, long-term storage is possible, which can be controlled according to requirements. By utilizing an oxidizing compound, for example, $B_aO_2$, a longer burn-in process for stabilizing the surface is unnecessary, such as is attained for $CO_2$ lasers in practice.

In order to enable homogenous and fast discharge (actuation) under high gas pressures and thereby small ranges of photon transmission, it is advantageous to introduce the low-ionizing molecules of the gas chamber into or onto the surfaces of the electrodes, walls, etc. This can in theory be realized with a solid reservoir in an electrode, whereby the embedded molecules are derived from the gas chamber or a pretreatment.

BRIEF DESCRIPTION OF THE DRAWINGS

The preferred embodiments of the invention and method of manufacture in accordance with the invention will be described in detail with reference to the following drawings, wherein:

FIG. 2a shows a cross section of an electrode, and FIGS. 2b and 2c respectively show the intensity of the discharge across the emitting electrode for two different dopant concentrations; and FIG. 3a shows the emission spectrum for an electrode, FIG. 3b shows the absorption spectrum for a disturbing admixture (for example, $O_2$ $H_2O$) and FIG. 3c shows the absorption spectrum for low-ionizing molecules.

DETAILED DESCRIPTION OF THE PREFERRED EMBODIMENT

Figure 1:
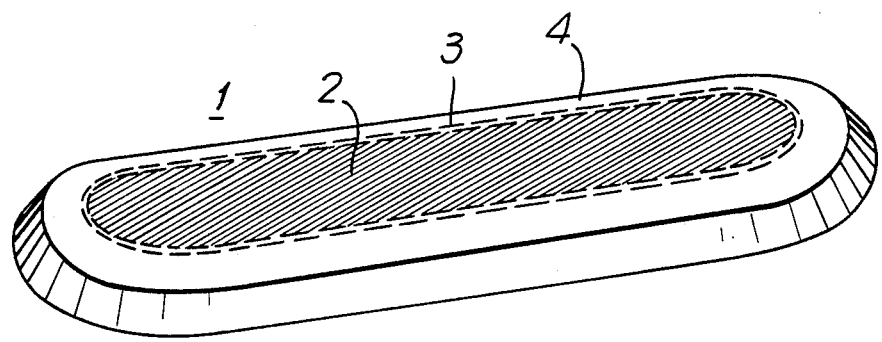
FIG. 1 shows a microstructure comprising two materials with different doping.

In FIG. 1 the continuous line depicts the boundary of part of the surface of an electrode for a gas laser, the electrode having a microstructure. Similarly, it is conceivable that it relates to an arbitrary wall surface which is provided to improve the initial conditions of the electrical discharge.

The hatched inner area 2 is a zone homogenously doped with solid, liquid or gaseous substances, whereas the outer-lying adjacent annular area 3, indicated by dashed lines, is a transition zone with varying dopant density. The unencompassed outer area 4 has the microstructure of the base material of which the electrode is constituted and on which the aforementioned zones 2 and 3 are formed by doping.

Such doping can be produced, for example, by first expanding the lattice of elementary units by heating, then introducing molecules into the expanded "pores"—if necessary, under pressure—and subsequently returning the material to its initial state by cooling. The lattice constant decreases linearly during the cooling process, so that the introduced molecules are to an extent snugly embedded in the lattice during contraction of the base material upon cooling.

In the preferred embodiment the surface depicted in FIG. 1 is composed of the materials 2, 3 and 4, wherein the reference numerals 2 and 3 denote different densities of one and the same material. In accordance with another preferred embodiment (not shown), it is obviously possible to dope the base material 4 with several materials of the same or different density. It is also possible to vary the density of one material or several materials underneath.

The micro-structured basic substances 2, 3 and 4 can be made of metals (for example, nickel, copper, titanium), precious metals, tungsten or molybdenum formed by powder metallurgy (for example, sintered), or any combination of these substances. For the construction of walls, adjacent insulators as well as semiconductors can be employed. The advantages in doing so are an easier optimization of the emission spectrum with regard to the absorption spectrum of the gas mixture and decreased loss adjacent the radiation of the additionally introduced materials of the surface. Other substances which ionize at low energy can be introduced with densities that vary as necessary, for example, C, $MoS_2$, Ba, BaO, $BaO_2$, Ca, CaO, Si, $SiO_2$ or also precious metals. The following emission energies can be achieved: (1) for oxides: $Cs_2O$—1.08 eV, SrO—2.0 eV, BaO—1.57 eV, CaO—2.3 eV; and (2) for metallic bonds: NiCs—1.36 eV, $CeB_6$—2.56 eV, $CaB_6$—2.8 eV.

Pure metals result in substantially improved charge carrier density in the gas chamber. For example, pure nickel and pure tungsten have the following emission energies: Ni—4.9 eV, W—4.6 eV.

By utilizing the low electron emission energies combined with suitably adjusted emission spectra, a further increase in the charge carrier density is realizable.

A nickel-impregnated tungsten or molybdenum framework, for example, can be used as the solid solution. Also solid solutions made of $Al_2O_3$ or $SiO_2$, respectively made by dry sintering with nickel or also another metal, are conceivable. Alternatively, metal oxide (e.g. $Al_2O_3$), metal nitride (e.g. AlN), metal boride (e.g. $CrB_2$), or also carbon fibers coated with nickel and sintered in a solid solution can be utilized.

Additional base materials include nickel sputtered with BaO or $SiO_2$ as well as titanium coated with $TiO_2$ by CVD.

FIG. 2a shows the upper surface of the doped electrode 5 in cross section.

FIGS. 2b and 2c represent the discharge over the middle zone of electrode 5 for two different dopant concentrations. In FIGS. 2b and 2c (but not FIG. 2a) the abscissa represents the distance from the geometric middle of the electrode and the ordinate represents the discharge intensity. In the case of FIG. 2b, the intensity is constant over the middle zone, whereas in the case of FIG. 2c, the intensity is variable over the middle zone. The two inner vertical dashed lines define the homogeneously doped zone 2.

FIG. 3a shows the emission characeristic of an electrode, a wall or a similar structure in accordance with the invention; FIG. 3b shows the absorption of $O_2$ or $H_2O$; and FIG. 3c shows the absorption of low-ionizing molecules as functions of the wavelength λ. In addition, the emission spectrum (for both the electrode and wall), is selected to conform to the absorption spectrum of the gas mixture, but at the same time—if necessary, using an optical filter—an effort is made to avoid radiation loss from the remaining admixture of the surface. This optimization is relatively complex because different gas mixtures produce very different spectra.

In the case of an electrical gas discharge, besides an effective charge carrier production by the electrode, a high conductivity in the gas is desired which, to the extent possible, is homogenous in space and time. The particles and photons produced in the discharge region or in zones near the discharge contribute to that end. In this connection, the production can occur through the discharge itself or through additional means, between peaks, corners and surfaces (such as corona, glow or RF discharge). Because a discharge has a strong dependence on the gas composition, the gas pressure, and the dimensions and type of discharge chamber, an optimization (matching) of the emission and absorption spectra of the gas (respectively, individual gas components) and the surfaces of the electrodes and walls (respectively, the additional means for employing ionization) is not necessary for an adequate functioning. For example, it is advantageous to employ a molecule for ionization which has a maximum of its emission spectrum (as shown in FIG. 3a) which does not coincide with the spectrum disturbance caused by the admixture such as $O_2$ or $H_2O$ (shown in FIG. 3b). Thereby one can ensure that relatively few photons are lost due to undesirable interactions (for example, collision and dissociation). The location and shape of the emission spectrum can be matched to the absorption spectra of the gases in the chamber by control of the discharge of the electrodes, walls or ionizing means, whereby an effective electron and ion production and thereby also a sufficiently high conductivity can be achieved.

What is claimed is:

1. An electrode for electrical discharge, especially in a gas, said electrode comprising a first portion made of a first material doped with a second material and a second portion made of said first material not doped with said second material, said first and second materials having different physical properties and said first portion having a surface for field emission, wherein said surface has a microstructure with a grain size range from 0.1 to 100 microns and a geometry which increases the field emission.

2. The electrode as defined in claim 1, wherein said materials differ in one or more of the following physical properties: band structure (i.e., Fermi levels), electron emission energy, emission spectrum, absorption spectrum, electrical conductivity, melting point, and the microstructure type and size.

3. An electrode for electrical discharge, especially in a gas, wherein a surface of said electrode has a microstructure with a grain size range from 0.1 to 100 microns and comprises a combination of first and second materials having different physical properties, said microstructure having a geometry which increases the field emission, said geometry comprising microstructural features having small radii of curvature, such as peaks, edges, canals, foldings, pores, craters and cones, and wherein a low-ionizing material is embedded in said microstructure with locally varying density.

4. The electrode as defined in claim 3, wherein said low-ionizing material comprises a compound of substances.

5. The electrode as defined in claim 4, wherein said compound comprises at least two substances taken from the following group: C, Mo, Ba, BaO, $BaO_2$, Ca, CaO, Si, $SiO_2$, $TiO_2$, $BaTiO_3$, and fiber composite material such as Ni-coated carbon fibers.

6. An electrode comprising a first material and having a surface layer for electrical discharge of gases, said surface layer comprising said first material and a second material different than said first material, said first and second materials each having a microstructure and forming a macrostructure, wherein:
   (a) the materials differ in at least one of the following properties: electron emission energy, sputter rate, emission spectrum and absorption spectrum;
   (b) the materials have different types of microstructure; and
   (c) said surface layer has a grain size range from 0.1 to 100 microns, the microstructure of said surface layer having a geometry which enhances field emission.

7. The electrode as defined in claim 6, wherein said first material is the main structural component and said second material has a lower electron emission energy.

8. The electrode as defined in claim 7, wherein said first material is a metal and said second material is a metallic compound.

9. The electrode as defined in claim 6, wherein said second material has an emission spectrum which conforms to the absorption spectrum of said first material.

10. The electrode as defined in claim 6, wherein said second material has an emission spectrum which conforms to the absorption spectrum of said gas.

11. The electrode as defined in claim 6, wherein said second material has an emission spectrum which conforms to the absorption spectrum of a component of said gas.

12. The electrode as defined in claim 2, wherein said second material has an emission spectrum which conforms to the absorption spectrum of said first material.

13. The electrode as defined in claim 6, wherein the microstructure of said surface layer has widely homogenous electrical and thermal conductivities.

14. The electrode as defined in claim 6, wherein said geometry which increases the field emission comprises microstructural features having small radii of curvature, such as peaks, edges, canals, foldings, pores, craters and cones.

15. The electrode as defined in claim 6, wherein said first and second materials comprise a solid solution formed by powder metallurgy.

16. The electrode as defined in claim 6 wherein said first and second materials comprise a solid solution of fiber-reinforced plastic.

17. The electrode as defined in claim 6, wherein said surface layer is made using at least one of the following processes: physical vacuum deposition coating, ionic plating, ion implantation, chemical vacuum deposition coating, and laser chemical vacuum deposition coating.

18. The electrode as defined in claim 6, wherein molecules with low ionization energy and/or spectra conforming to the discharge are embedded in said first material, said molecules being selected from the group of molecules including C, $MoS_2$, Ba, BaO, $BaO_2$, Ca, CaO, Si, $SiO_2$, $Cs_2O$, SrO, NiCs, $CeB_6$, $CaB_6$ and precious metals.

19. The electrode as defined in claim 6, wherein said surface is made by thermal implantation of molecules in the lattice structure.

* * * * *